2 Sheets—Sheet 1.
J. N. POAGE.
Watering Columns.
No. 9,502. Reissued Dec. 21, 1880.
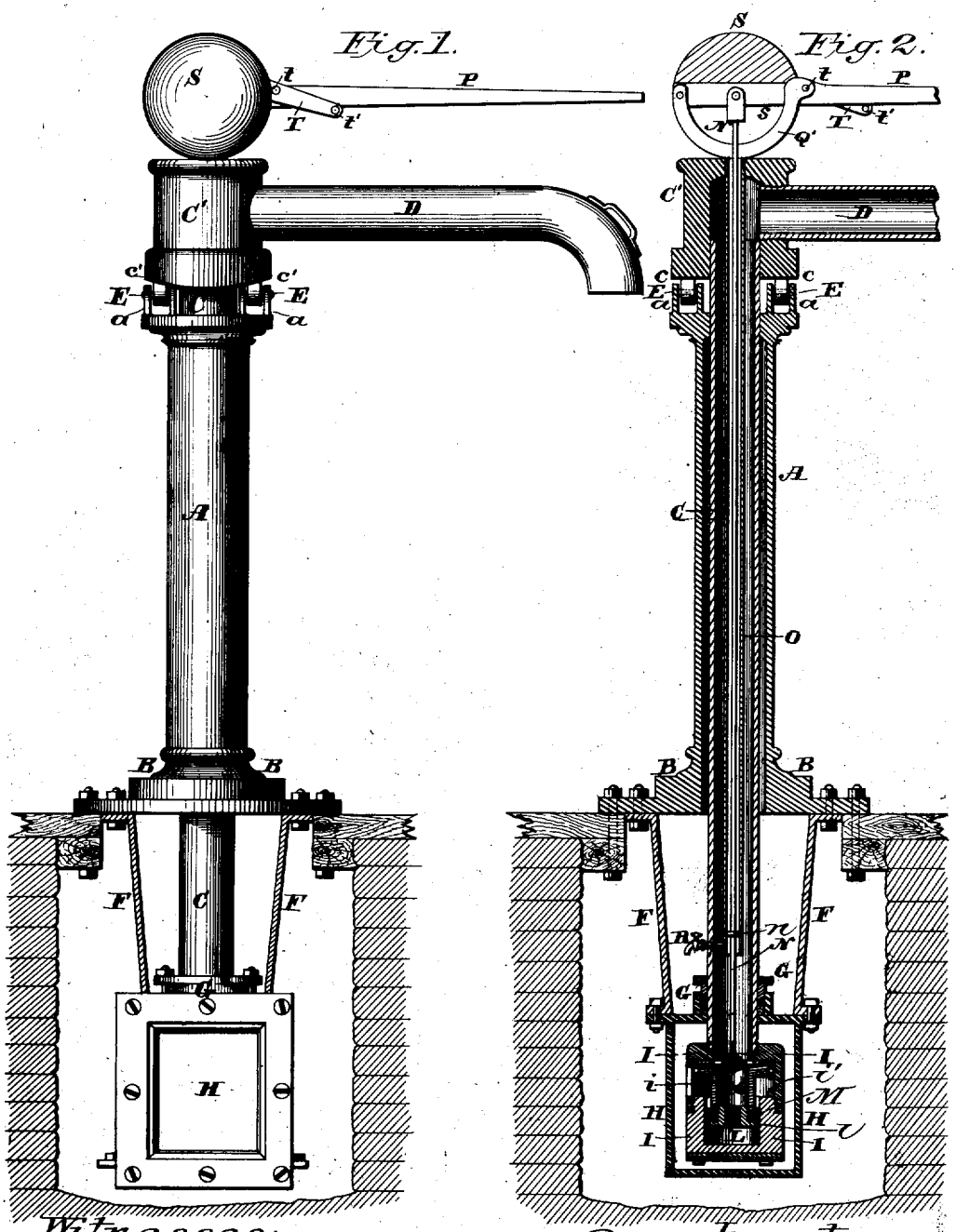
Witnesses:
George C. Symmestedt
E. Kelihan
Inventor:
John N. Poage
by L. M. Hosea, atty 2 Sheets—Sheet 2.

J. N. POAGE.

Watering Columns.

No. 9,502. Reissued Dec. 21, 1880.

Witnesses:

George C. Symmestedt

J. Kelihan

Inventor:

John N. Poage, by L. McHowell,

Atty.

UNITED STATES PATENT OFFICE.

JOHN N. POAGE, OF CINCINNATI, OHIO.

WATERING-COLUMN.

SPECIFICATION forming part of Reissued Letters Patent No. 9,502, dated December 21, 1880.

Original No. 139,188, dated May 20, 1873. Application for reissue filed August 21, 1880.

*To all whom it may concern:*

Be it known that I, JOHN N. POAGE, of Cincinnati, in the county of Hamilton and State of Ohio, have invented certain new and useful Improvements in Watering-Columns for Railroad Water-Tanks; and I do hereby declare that the following is a specification thereof, reference being had to the accompanying drawings, in which—

Figure 3:
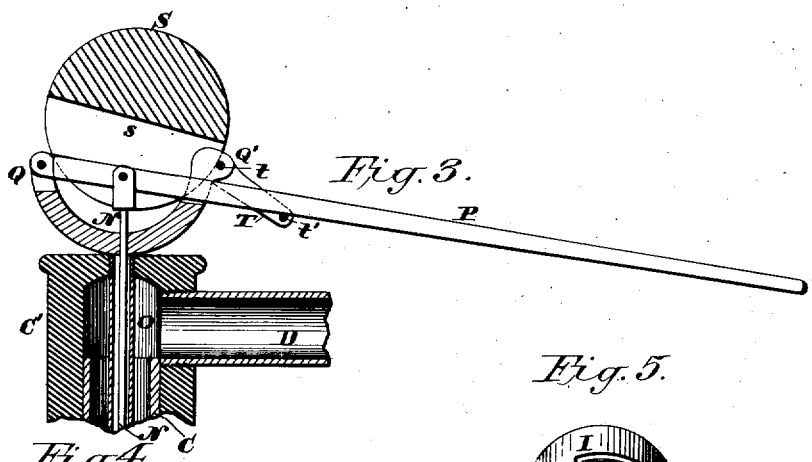
Figure 4:
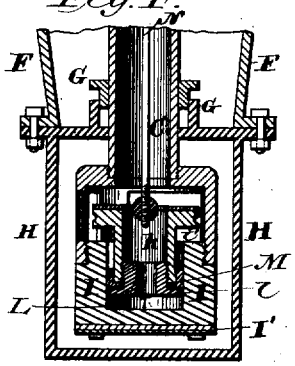
Figure 5:
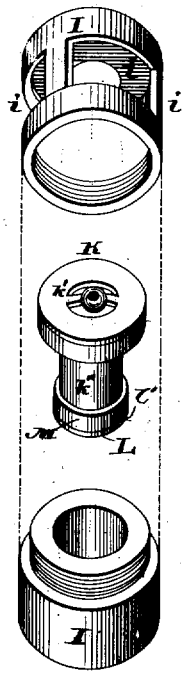
Figure 6:
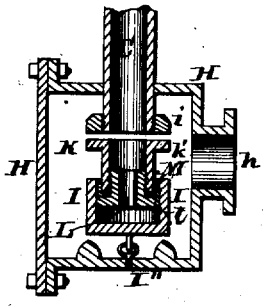

Figure 1 is a side elevation of my improved device as arranged for use. Fig. 2 is a vertical section of the same. Fig. 3 is an enlarged central section of the upper portion of the column, showing the position of the operating-lever and counter-balance when the valve is open. Fig. 4 is a like view of the lower portion of the column, showing the arrangement of parts when said valve is open. Fig. 5 is a perspective view of the valve and of the valve-chamber in its detached parts separated. Fig. 6 is a vertical central section of the valve, valve-box, and the casing for the same, showing a modification in the construction of the valve-box and a means for attaching the same to or upon its casing.

Similar letters refer to like parts throughout the several figures of the drawings.

My invention relates to that class of railway watering-columns having a rotating stand-pipe and a lateral discharge-pipe designed to stand normally in line with the track and be swung aside for use; and its object is to improve the general usefulness, efficiency, and convenience of manipulation of such watering-columns, and to lessen their liability to injury from freezing and other causes.

To this end my invention consists in the combination, with a rotating water-column, of means for causing the lateral discharge-spout to be automatically returned to its normal position in line with the track when released from temporary use; in the mechanism employed for retaining the discharge-spout in its normal position and returning it by gravity automatically thereto when released from use; in a railway water-column, the combination of a rotating stand-pipe having a lateral discharge-spout attached thereto and rotating therewith, with a supply-valve arranged centrally in the vertical line of the column, and a valve-rod extending centrally within and above the column, provided with actuating mechanism extending over and swinging with the lateral discharge-spout; in the combination, with the valve-rod arranged within the column, of a tube surrounding the rod and extending from the head down to a point near the bottom of the stand-pipe, and a piston-head upon the rod operating in said tube as a means of preventing the water rising around the rod to the head of the column; in the combination, with the main supply-valve, of means for automatically governing and regulating its movements, thereby preventing injuries to the column or valve connections from sudden pressure and other causes; in the combination, with the tube and its piston, of a wasteway aperture and pipe extending through the stand-pipe as a means of discharging the water from the column after use; in the combination, with the column and its valve-operating mechanism, of a weight arranged upon and in the vertical line of the column as a counter-balance to the valve and operating parts, and to assist the automatic rotation of the column; and in the arrangement of parts constituting the main features of the device as a whole, whereby the working parts are protected from injury from the weather, and from being tampered with by unauthorized persons, and the device rendered generally more efficient.

In the annexed drawings, A represents a hollow standard rising vertically a convenient distance above an extended base, B, by which it is secured upon a platform, and forms a support for the stand-pipe or water-column proper, C, which extends through the supporting-standard A above and below. The stand-pipe or column C is furnished at its upper projecting end with an enlargement or head, C′, the lower edge, *c*, of which rests upon the upper end of the said standard, which thus furnishes a pedestal-support for the stand-pipe.

From the stand-pipe C a discharge-pipe, D, extends horizontally outward from the head C′ a sufficient distance, and has its end curved downward, so as to direct the stream of water into the supply-opening of the tender, when swung at right angles to the track for that purpose.

It is necessary that the discharge-pipe D shall stand normally parallel with the line of track, and it is desirable that it shall automatically return to and be retained in its normal position when released from use. To accomplish this result I utilize the gravity of the stand-pipe rotating within and upon its pedestal-support. A convenient form of mechanism for this purpose is produced by constructing the lower edge or shoulder, *c*, of the enlargement C′, in the form of a double incline, *c′*, on opposite sides of the stand-pipe, and in line with the lateral discharge-pipe D, as shown in Fig. 1.

Between suitable lugs *a*, attached to and projecting upward from the upper end of the pedestal A, on opposite sides of the stand-pipe, are journaled two rollers, E, having their axes in a horizontal line parallel to the track, and furnishing a bearing, upon which the stand-pipe rests.

As thus arranged it will be seen that when the discharge-pipe D is swung outward at a right angle to the track, the head C′ of the stand-pipe will rest at its deepest portions upon the rollers, and the stand-pipe will be elevated to its highest point; but when said pipe D is turned in either direction the inclined surfaces of the head C′ will rest upon the rollers, and the weight of the parts will cause the continued rotation until the discharge-pipe reaches its normal position and the stand-pipe rests at its lowest elevation, where it is retained by the bearing-contact of the rollers in the notches at the intersection of the inclined surfaces of the head C′.

It will be seen that by this construction of parts it is impracticable for the discharge-pipe to remain at an angle to the track, except when purposely placed in such position and detained, and that when released a slight movement in either direction will cause said pipe to return to place, when its weight will be sufficient to prevent displacement by the wind. Although the arrangement shown is preferably employed, a like result would be obtained if the positions of the rollers and inclines were reversed, the former being attached to the pipe C, and the latter constructed upon the standard A.

To the lower end of the standard A is secured a waste-water casing, F, which has, preferably, the shape shown, and is provided within its lower and otherwise close end with a stuffing-box, G, of usual construction, through which the lower end of the pipe C passes.

Attached to the lower end of the casing F is a second casing, H, which contains the valve-box I, and, by means of an opening, *h*, that is provided in and through one side, receives the supply of water that is to be passed upward through the pipes C and D. The valve-box I is cylindrical in form, and its upper end is provided with an opening, which receives and contains the lower end of the pipe C. From a point immediately below the end of the pipe C to or near its vertical center the interior of the valve-box has about twice the diameter of said pipe, while from its center downward to near its closed end the diameter of its interior is substantially the same as that of said pipe. A number of lateral openings, *i*, provided in and through the wall of the valve-box I, opposite to the largest portion of its interior, completes the said part.

The valve K is cylindrical, is provided with a central opening, *k*, and exteriorly corresponds in horizontal dimensions at its upper end to the largest portion of the interior of the valve-box, and from thence downward to its lower end has substantially the dimensions of the smaller portion of the interior of said box.

Within the lower end of the valve is fitted a nut, L, which is provided with a flange or head, *l*, that extends outward beneath said end and confines between itself and the same a disk, M, of leather, rubber, or other elastic material, which disk, projecting outward against the wall of the valve-box, forms a packing between the same and said valve. Vertically, the relative dimensions of the valve and valve-box are such that when the former is moved downward to its lowest point the space between its upper end or face, *k′*, and the corresponding end *i′* of the interior of said valve-box shall be sufficient to permit the desired quantity of water to enter the pipe C.

The nut L is provided with a vertical aperture, through which communication is had between the interior of the valve K and the lower chamber of the valve-box.

It will be readily understood that the movement of the valve up or down causes the chamber to be filled or emptied by water flowing through the aperture of the nut L, and that these movements can be regulated as desired by adjusting the area of the aperture. By this means any sudden movement of the valve is prevented, and injury from this cause avoided.

The valve K is operated by means of a rod, N, attached to its upper end, and thence extending upward through a pipe, O, which is placed within the center of the pipe C, and has its upper open end secured to and within the corresponding end of the same. The upper end of said rod is pivoted to or upon a lever, P, which is, in turn, pivoted at one end to or upon a suitable lug, Q, that extends upward from the pipe C, and from thence extends forward in a line with and above the discharge-pipe D. By depressing the free end of said lever said valve will be moved downward, so as to permit water to pass inward and upward between its face and the valve-seat.

From the peculiar construction of the valve, and its combination with its box, it will be seen that but a small proportion of the upward pressure of the water is exerted upon it when seated, while when opened or removed from its seat the pressure is completely neutralized, and said valve rendered entirely free in its movements. By increasing or diminishing the relative size of the lower portion, *k″*, of the valve in accordance with the pressure of the water-supply, the upward pressure upon said valve may be so adjusted as to cause the same to seat well without requiring unnecessary force to remove it therefrom.

As the valve-box I is attached to and moves freely with the column C, the relative positions of the operating-lever P and valve K are at all times preserved. Should the water-pressure be excessive its effect may be to overcome the weight of the column C and its attachments and raise the same so as to remove the inclines from contact with their bearing-rollers. In such an event metal plates I′ may be attached to the bottom of the valve-box or to some other portion of the device; or, as seen in Fig. 6, said box may be constructed separate from the valve-seat and from the pipe C, and attached to the lower side of the casing by means of a swivel-rod, I″. This latter mode, however, will only be necessary in places where the water-pressure is so great as to render inoperative the employment of the weight I′.

In order that water may not pass upward through the tube O when the valve is opened, a piston, *n*, is secured upon the rod N, and, closely filling said tube, moves upward or downward with said rod. The apparatus is set so as to bring the lower end of the tube O below the freezing-point, and after each use of said apparatus the water is discharged from the pipe C by means of a drain-pipe, R, which passes horizontally inward from the casing F, through said pipe C, and into said tube O, just below the piston *n*, when the latter is at its highest point. When the valve K is opened the piston *n*, passing below the open end of the drain-pipe, cuts off communication between the same and the interior of the pipe C; but upon closing said valve said piston passes above and uncovers said drain-pipe, and permits the water to flow freely into the same, through the lower end of the tube O, until all above said drain-pipe has escaped, when all liability to obstruction from freezing will cease. The piston *n* not only regulates the escape of the water from the pipe C, but also prevents the passage of water upward through the tube O, and thus obviates the necessity which would otherwise exist for the employment of a stuffing-box where the valve-rod passes into the open air, which stuffing-box would be liable to become obstructed by the action of the frost.

The operating-lever, valve-rod, and valve have a considerable weight in a full-sized machine; and in order that their normal positions may be insured independent of the action of the water upon said valve, it is found necessary to counterbalance the weight of said parts. The result named is accomplished by means of a weight, S, which has preferably a spherical shape, and is provided upon its lower side with a slot, *s*, that corresponds in size and shape to the like features of the rear end of the operating-lever P and its pivotal bearing Q, and enables said weight to be placed over said parts, so as to rest upon the upper end of the column C, as seen in Fig. 1.

From the front side and vertical center of the weight S two arms, T, project forward and downward upon opposite sides of the lever P and of a second bearing-lug, Q′, which latter passes upward from the column C and incloses said lever within a suitable vertical slot provided for the purpose. A stud or pin, *t*, passing horizontally inward through each arm T, immediately in front of the weight S, has its inner end contained within a corresponding opening formed within the contiguous portion of the lug Q′, and, in connection with the opposite stud, furnishes a pivotal bearing for and upon which said weight oscillates. A pin, *t′*, passing through the ends of the arms T, immediately below the lever P, completes the apparatus, the operation of which is as follows:

Upon depressing the outer end of the lever P the corresponding ends of the arms T will be carried downward by and with said lever, and the weight S raised to the position shown in Fig. 3. Upon releasing the lever the weight, operating through its arms, will raise the same to its normal position, and, dropping downward, will rest, as before, upon the upper end of the column C. As arranged, the weight occupies no space which could be made available for other purposes, and is entirely removed from contact with passing trains upon either track, whether the watering-column is in use or at rest, in addition to which advantages the symmetry of the apparatus is preserved and its general appearance improved by the application of said weight, besides which the application and arrangement of the weight upon the column, independently of its other functions, contributes to the automatic action of the column in resuming its normal position after displacement therefrom, as hereinbefore described.

The entire apparatus, as constructed and arranged, is simple, compact, and efficient, not liable to injury from frost, is easily and conveniently operated by the fireman without leaving the tender of his engine, and by returning automatically to position with the discharge-pipe in line with the track all danger to or from passing trains is prevented. The combination and arrangement of the rotating stand-pipe with and within a permanent casing forming a pedestal-support strengthens the structure and protects it from injury from weather or accident or from tampering by unauthorized persons.

The foregoing arrangement of parts, with the valve-rod arranged within the column, and its operating-lever above the column, completely protects the structure and its operating mechanism from being tampered with or injured by persons upon the ground, while contributing greatly to its convenient manipulation and general usefulness.

I claim—

1. In a railway water-column, the combination, with a rotating stand-pipe, of mechanism for causing the lateral discharge-spout to return automatically to its normal position in line with the track when released from use, substantially as set forth.

2. In a railway water-column, the combination, with a hollow supporting-pedestal, of a rotating stand-pipe adapted to rise and fall therein, and with mechanism whereby the column is rotated by gravity to return automatically to its normal position with its lateral discharge-pipe in line with the track when released from use, as set forth.

3. In a railway water-column, the combination, with a hollow supporting-pedestal, of a rotating stand-pipe adapted to rise and fall therein, and with mechanism for retaining the stand-pipe and its lateral discharge-spout normally in line with the track by its own gravity, as set forth.

4. In combination with the casing A and rotating stand-pipe C, provided with an enlargement or head, C′, having a shoulder, *c*, the double inclines *c′* and rollers E, substantially and for the purpose set forth.

5. In a railway water-column, the combination of a rotating stand-pipe having a lateral discharge-spout attached thereto and rotating therewith, with a supply-valve arranged centrally in the vertical line of the column, and a valve-rod extending centrally within and above the column, provided with actuating mechanism extending over and swinging with the lateral discharge-spout, substantially as set forth.

6. In combination with the rotating column C and its lateral discharge-spout, the supply-valve K, rod N, and actuating-lever P, arranged upon the discharge-spout, substantially as and for the purpose specified.

7. The combination, with the main supply-valve of a railway water-column, of mechanism whereby the movement of the valve is governed and sudden reseating prevented, substantially as and for the purpose specified.

8. The combination, with the supply-valve of a railway water-column, of a plunger operating in connection therewith in a closed or partially-closed chamber, whereby the passage of water into and out of said chamber is utilized as a means of regulating the movement of the main valve, substantially as and for the purpose set forth.

9. In a railway watering-column, in combination with the valve-box I, provided with lateral and upper openings and a lower cylindrical chamber, the hollow valve K, provided with a perforated nut, L, forming a piston operating in said lower chamber in connection with the valve, substantially as specified, for the purpose set forth.

10. In combination with the column C and valve-rod N, the pipe or tube O, secured within the upper end of said column and extending downward within the same to a point near the valve-box, substantially as and for the purpose specified.

11. In combination with the pipe O and column C, the waste-pipe R, substantially as and for the purpose specified.

12. In combination with the valve-rod N, tube O, and waste-pipe R, the piston *n*, secured upon and moving with said rod, substantially as and for the purpose specified.

13. In combination with the rotating and rising-and-falling stand-pipe of a railway water-column, a weight arranged above and in the vertical line of the column to counterbalance the valve and its operating mechanism, and assist the automatic movement of the column in returning to its normal position at rest, as set forth.

14. In combination with the pivoted operating-lever P, the slotted weight S, provided with arms T, pivoted to or upon the lug Q′, inclosing said lug and lever, and caused to engage with the latter by means of the pin *t′* passing through the ends of said arms, substantially as and for the purpose specified.

15. A railway water-column consisting, essentially, of a rotating stand-pipe inclosed by and having its bearing upon a housing or pedestal secured to the platform, and upon which bearing it is actuated by gravity to return to its normal position of rest when rotated therefrom, a valve-rod arranged within the column, and a valve-lever extending laterally above the discharge-spout, substantially as specified.

In testimony whereof I have hereunto set my hand.

JOHN N. POAGE.

Witnesses:
L. M. HOSEA,
EDWIN CRAWLEY, Jr.